United States Patent [19]
Kim et al.

[11] B 4,001,459
[45] Jan. 4, 1977

[54] FIBROUS PROTEIN MATERIALS

[75] Inventors: Myung Ki Kim, Tarrytown; Joaquin Castro Lugay, Thornwood, both of N.Y.

[73] Assignee: General Foods Corporation, White Plains, N.Y.

[22] Filed: June 18, 1974

[21] Appl. No.: 480,987

[44] Published under the second Trial Voluntary Protest Program on March 30, 1976 as document No. B 480,987.

[52] U.S. Cl. .............................. 426/656; 426/385; 426/802

[51] Int. Cl.² .......................................... A23J 3/00

[58] Field of Search .......... 426/137, 350, 385, 362, 426/364, 384, 656, 802

[56] References Cited
UNITED STATES PATENTS

| | | | |
|---|---|---|---|
| 3,047,395 | 7/1962 | Rusoff et al. | 426/104 |
| 3,488,770 | 1/1970 | Atkinson | 426/104 |
| 3,490,914 | 1/1970 | Okumura et al. | 426/364 |
| 3,801,713 | 4/1974 | Tolstoguzov et al. | 426/350 X |

*Primary Examiner*—James R. Hoffman
*Attorney, Agent, or Firm*—Thaddius J. Carvis; Bruno P. Struzzi; Daniel J. Donovan

[57] ABSTRACT

Disclosed is a method for producing fibrous protein materials useful for meat analogs. According to this method, an aqueous mixture of a heat coagulable protein is frozen by cooling the mixture in a manner and at a rate effective to produce elongated ice crystals generally aligned perpendicular to the surface of cooling, freeze drying the frozen mass, and heat setting the dried protein material. The properties of a wide variety of meat products can be simulated.

12 Claims, No Drawings

FIBROUS PROTEIN MATERIALS

BACKGROUND OF THE INVENTION

This invention relates to textured proteins. More specifically, the present invention provides a new process for preparing fibrous protein materials which can be used as, or in the production of, meat analogs.

In recent years, considerable research efforts have been focused upon developing new technology for producing meat-like, protein-containing foods from various vegetable and animal protein sources. Economics provides a major incentive. It would clearly be advantageous to substitute, at least in part, the more efficient process of growing vegetable protein for the rather inefficient process by which animals convert the proteinaceous vegetable materials into meat. This is especially true where the ever-increasing human population is feared to be out-distancing the availability of grazing land for meat-producing animals. Additionally, recent efforts have also been directed to avoiding certain natural products which may be undesirable for religous, ethnic, or health reasons.

All natural meats, including fish and poultry, have fibrous structures. The texture of the meat products is inherently dependent upon the fibrous nature of the meat. Likewise, the presence of a fibrous structure is an important factor in fabricated meat-like products. Thus, in producing these meat-like products, e.g. meat analogs, much effort has been directed to creating a fibrous structure, similar to natural meat. Many workers have developed a wide variety of techniques for obtaining fibrocity, and a good deal of published literature is available on the production of meat analogs with fibrous structures.

One early worker, Boyer, in U.S. Pat. No. 2,682,466 disclosed the formation of synthetic meat products containing quantities of vegetable protein filaments. These protein filaments are made by forcing a colloidal protein dispersion through a porous membrane, such as a spinnerette, into a coagulating bath causing precipitation of the protein in filament form. The filaments are assembled into a meat-like product by employing binding materials, including cereals and protein. The use of spun vegetable fibers enables the formation of a highly aligned fibrous structure. Unfortunately, the manufacture of spun fibers is complicated and relatively high in cost. Moreover, spun vegetable protein is generally poor nutritionally because the starting material depends on soy isolate.

In view of the difficulties inherent in spun fiber technology, other workers were encouraged to seek alternatives to this technique. One alternative, disclosed in U.S. Pat. No. 3,488,770, describes the production of a proteinaceous meat-like product having an open celled structure with cell length greater than cell width, and with the cells being substantially aligned. This product is made by extruding a dough, substantially free of non-proteinaceous filler, into an area of reduced pressure to cause expansion. Another alternative process working with a dough is disclosed in U.S. Pat. No. 3,693,533. According to that process, the protein containing dough is coagulated while being passed through a set of converging conveyors. The resulting stretching during coagulation produces what are described as unidirectional fibers. While these processes are potentially less costly than the spun fiber technology, they suffer a penalty in the quality of the fibers produced.

Several workers, in Japanese Pat. Nos. 48-21,502 and 48-34,228, and French Pat. Nos. 2,130,254 and 2,130,282, describe the production of fibrous protein masses by processes including freezing a protein solution or dispersion and heating the frozen mass to heat set the protein. These fibrous products are described as being meat-like.

SUMMARY OF THE INVENTION

In view of the above difficulties with prior art techniques, it would be advantageous to have a method which would be capable of producing a textured protein material having a highly-defined fibrous structure which would be both nutritious and economical.

Accordingly, it is an object of the present invention to provide a simple and economical method for producing a high quality textured protein material having a highly-defined fibrous structure, high nutrition, excellent rehydration characteristics and good overall texture.

It is another object of the present invention to provide a means to reconstruct meat scrap alone or with another protein into a structure resembling high quality meat.

These and other objects are accomplished according to the present invention which provides a method for producing fibrous protein materials. This method, in its broad aspects, comprises freezing an aqueous mixture of heat coagulable protein by cooling in a manner and at a rate effective to create elongated ice crystals generally aligned perpendicular to the surface of cooling, freeze drying the frozen mass, and heat setting the dried mass.

DETAILED DESCRIPTION

According to the present invention, a wide variety of meat-like textures can be simulated using a wide variety of protein materials. The common characteristic of all of these products is the presence of well-defined, well-ordered fibers. The fibers are produced by the present method from protein of vegetable or animal origin—used separately or in combination. In this manner it is possible to easily balance the textural, taste and nutritional characteristics of the fibers to provide a textured protein material having the desired characteristics. Among the features important to the present invention are the need for cooling in a direction and at a rate effective to produce the well-defined, well-ordered ice crystals, and the need to freeze dry the frozen mass prior to heat setting to assure retention of the fibrous structure defined by the ice crystals.

Any edible protein, or combination of proteins, can be employed in the process of the present invention, providing that the sole protein or, in the case of combinations, at least one of the proteins is soluble or partially soluble and can be stabilized by heat treatment. In general, proteins having excellent solubility provide excellent, distinct fibrous structures—probably because the ice crystals can grow freely, unrestricted by undissolved solids. However, protein solutions containing considerable insoluble material, such as soy flour, meat homogenates, and fish homogenates, can also be employed with good results to form fibrous structures according to the present invention. Representative of the protein materials which can be employed to give excellent results according to the present process are soy milk, soy isolates, whole milk, meat slurries, fish slurries, gluten, soy flour, wheat protein concentrate, milk whey, egg protein, blood protein, single cell protein, and the like.

The final texture of the products depends in part on the protein source employed, as well as the additives such as flavoring, fillers, fat, carbohydrates, salts, and the like. For example, the products prepared from soy milk have a juicy, smooth, soft texture with good fiber tensile strength. The soy milk produces a product having a smoothness and softness resembling raw chicken meat, probably due to the oil emulsified in the protein. Soy flour, on the other hand, gives a product with lower tensile strength than the soy milk, but this type of tenderness is desired in some products either alone or as a component with another protein material.

The protein, from whatever source, is admixed with water to form an aqueous protein mixture wherein at least a portion of the protein is dissolved in the water. The aqueous protein mixture can be characterized as a solution, dispersion or suspension of protein and water. To increase the degree of solubility of the protein, which varies for different types of protein, the pH of the mixture can be adjusted. To obtain the optimum tensile strength and fiber integrity it is usually desirable to adjust the pH of the aqueous protein mixture to the point of maximum protein solubility. The pH of the mixture appears to directly affect the tensile strength of the final textured product. Some protein materials such as soy flour, give better texture and tensile strength at high pH, e.g. pH 10, than at lower pH. This is probably because these proteins are more soluble at higher pH, and are partially dissociated and denatured by the alkaline condition before texturization. At high pH, the protein molecules tend to unfold, allowing more complete dissociation and apparently allowing more freedom of movement during freezing to form more perfect fibers. Some proteins, such as egg white have good solubility at their natural pH and need not have their pH adjusted to alkaline condition.

While high pH is sometimes useful in preparing the textured product, excessively high pH values may not be desirable in a meat analog product. The pH of the final product can be reduced during rehydration, to be later explained in detail, by the use of an acid in the rehydration bath. At times, however, reducing the pH of the textured product to a level below the point at which the particular protein is immobilized, may affect the texture of the product. Depending on the particular end use contemplated, this textural effect may be desirable or undesirable. For the proteins which are solubilized at their natural pH of 6 to 8, no neutralization will be needed.

The aqueous protein mixture is easily obtained by mixing the protein in water. If necessary, the protein material can be finely divided or comminuted either before or after mixing with the water; and, the pH can be adjusted to obtain the optimum solubility. The presence of soluble and insoluble non-coagulating materials is acceptable, and indeed in some cases desirable, so long as it does not adversely affect the desirable qualities of the fiber structure for a particular application. In some cases, the presence of excessive amounts of fat would be undesirable where it would reduce the tensile properties of the fibers. However, in other cases, a reduced tensile strength would be desirable as it would impart a more tender texture to the product. Thus, those additives normally employed in forming fibrous meat analog products can be employed according to the present invention; it being realized that the process of the present invention provides a process capable of widely modifying the compositional features of the fiber forming material to obtain a wide variety of textural and nutritional variations from the single basic process. It is an added advantage of the present invention that relatively high fat contents can be employed and a good fiber structure obtained.

The solids concentration of the mixture can affect both product texture and processing efficiency. It is generally desirable to maintain low solids concentrations. One reason is that there is a tendency to diminish distinct fibrous structure by increasing the concentration of solids. Typically, the solids will not exceed about 35%, and preferably not more than about 20% of the mixture on a weight basis. When the solids concentration increases, the efficiency of freeze drying is reduced. However, processing at excessively low concentrations loses economy due to the increased costs of removing the water. The costs for energy, vessels, transfer and storage equipment increase rapidly as concentration is reduced. However, the quality of the fibers produced at low concentrations is high. It is therefore necessary to determine the optimum concentration for each particular system, understanding that there are many influences which must be considered. In a very broad sense it can be said that the optimum concentration for freezing will be any where from about 3% to about 20% protein based upon the total weight of the aqueous protein mixture. It is clear however that the optima for particular protein and additive materials, may vary widely within this range and at times extend beyond this range. Those skilled in the art will be able to determine the optima for the particular systems employed, especially with the knowledge of the economics of their particular processing equipment and procedures. Reference to the examples below will provide those skilled in the art with working examples of a number of different systems. Any concentration effective to produce substantially independent, oriented fibers is acceptable according to the present invention. The particular concentration must be determined in each case for the balance of product physical properties and processing efficiency which is desirable and and justified. It is noted that a gelled protein material of the type employed in forming Tofu, where the water is restricted from forming long crystals by the gell structure, cannot be employed according to the present invention.

Once prepared, the aqueous protein mixture is frozen by cooling according to a defined directional pattern to provide a well-defined, well-ordered fibrous structure produced by the ice crystals. As the water is frozen to ice crystals, the remaining protein mixture becomes more concentrated. The formation of the ice crystals separates the protein material into distinct, generally parallel aligned zones. Any means capable of accomplishing this result is suitable according to the present invention. The ice crystals form in a latice-work entrapping protein in orderly fiber-like portions between the elongated ice crystals. The zones of protein material are separated from each other almost completely—forming substantially independent fibers of protein when coagulated. However, the zones of protein are not completely independent of each other and are joined at sufficient locations to bind the individual zones into a branched or cross-linked structure. The degree of binding achieved is just sufficient to provide a cohesiveness to the final product similar to cooked meat, and does not destroy the substantially independent fibers. This binding, achieved during the formation of the fibers, eliminates the need for added binder materials.

Freezing is obtainable by cooling at least one surface, preferably one surface or two opposed surfaces, of the mixture to below the freezing temperature of the mixture. The cooling or refrigerating preferably causes freezing to take place throughout the thickness of the mass to produce generally parallel fibers, aligned generally perpendicularly to the cooling surfaces. Desirably, the cooling surfaces or surfaces will be planar; however, they can have any other, regular or irregular configuration. For example, a single cooling surface can be employed having a hemispherical, spherical or cylindrical configuration in contact with the aqueous protein mixture. In these exemplary situations, the ice crystals, and thus the protein fibers, would form generally perpendicularly to tangents to the surface, radiating generally toward the center. During freezing, a boundary between the frozen mixture and the liquid mixture appears and moves in the direction of cooling. At typical freezing temperatures employed according to the present invention, and where the cooling surface is not highly irregular, the boundary will generally conform to the shape of the cooled surface of the protein mixture. However, under other conditions according to the present invention, the boundary will assume a somewhat modified shape. It is to be understood that after an initial thickness of the mixture has been frozen, the moving boundary of freezing becomes the cooling surface through which heat transfer takes place. It is this moving boundary, which then controls the pattern of the formation of ice crystals and, therefore, fibers. The important consideration in all cases is the production of well-defined fibers having an orderly alignment similar to natural meat. If needed, the surfaces of the mass not in contact with the cooling source can be insulated to reduce heat transfer at these surfaces. It is observed, in most cases, that the surfaces not in contact with the one or the two opposed cooling surfaces exhibit a thickness of somewhat randomly oriented fibers. This is because directional cooling at these edges is difficult to obtain due to heat transfer with external sources. This edge portion can be either retained in the final product or severed therefrom such as by cutting with a knife, heated wire or the like. It is also noted that where cooling is effected from two opposed surfaces, horizontal surfaces of discontinuity appear, bisecting the thickness of the frozen mass. This is apparently due to the independent crystal growth from each of the opposed surfaces toward a plane of contact in the middle of the mass.

Many cooling sources can be employed according to the present invention. For example, the aqueous protein mixture can simply be placed in a pan and the pan set on a piece of dry ice or submerged to a slight depth (e.g. ⅛ inch) in a cold liquid such as liquid nitrogen, ethylene glycol, brine, or the like. Alternatively, a container of the aqueous protein material can be placed on a plate freezer or between two opposed plate freezers. Also suitable would be a moving belt type freezer of the kind illustrated in U.S. Pat. Nos. 3,253,420 and 3,606,763. The temperature employed can be any temperature effective to yield substantially independent, aligned ice crystals. It is noted that while the rate of cooling is generally not a factor with regard to the formation of well-defined, well-ordered, elongated fibers where the cooling is substantially unidirectional, the rate of cooling does definitely affect the size and shape of the crystal. Rapid cooling rates result in the formation of minute, microscopic ice crystals. Slower cooling or freezing rates result in the formation of long, needle-like ice crystals. Preferred cooling rates, defined in terms of the rate of advance of the freezing boundary, range from about 0.02 to about 1.0 ft/hr, more preferably from about 0.03 to about 0.5 ft/hr.

While there is nothing presently believed critical in the temperature of the protein solution or slurry prior to the freezing step, it is considered preferably to reduce the temperature of the solution or slurry to as close to the freezing point as possible prior to subjecting it to freezing. This is preferred at the present time solely on the basis of economics. It is less expensive to cool a liquid by conventional means with turbulence and high surface contact with the heat transfer media than to cool by means of the single or two opposed heat transfer elements employed for freezing. It is cautioned, however, that the liquid mixture should not be supercooled prior to the freezing operation as this will result in too rapid, random cooling and will produce an undesirable, random fiber structure in the product.

After freezing, the crystalline structure of the material can be easily observed, if desired, by fracturing the frozen mass and observing it visually. To retain the integrity of the individual protein fibers thus formed, it is necessary to first freeze dry the mass and then heat set the fibers. It is imperative that this sequence be followed or the heat setting step will result in excessive bonding of the individual fibers due to melting of the ice crystal lattice separating them. As the fibers are then heat set, they tend to form a less distinctly fibrous mass. For many meat analogs, and especially fish analogs, this excessive bonding of the protein material is undesired. Also in this regard, the frozen mass should not be stored at temperatures which are only slightly below the freezing point of the mass for extending periods of time. Storage under these conditions will cause recrystalization of the ice and randomization of the fibrous structure. While this may be desirable to some extent as a means of affecting the texture of a final meat analog, it must only be done with the knowlede that reorientation is occuring, and it must be allowed to proceed only to the extent that would be desirable for a particular application.

The frozen mass is freeze dried in conventional manner using conventional equipment. The product can be subdivided either before or after freeze drying. It should be dried sufficiently to reduce the moisture content to the point where the structure does not collapse. The details of freeze drying are well known to those skilled in the art and form no part of the present invention. A detailed discussion of freeze drying techniques which would be suitable according to the present invention, reference is made to Van Arsdale, W. B., and Morgan, A. I.; *Food Dehydration*, Second ed., Vol. 1; AVI publishing. In an exemplary freeze drying situation a laboratory freeze drier is employed to freeze a one inch thick slab having a total volume of 3 liters. The drying takes approximately 2 days to reduce the moisture content to a level of from about 3% to about 5%. In this specific set-up, the plate temperature is about 20° to about 30°C, preferably about 25°C; the condenser temperature is from about −40° to about −70°C, preferably about −50°C; and the pressure of the freeze drying chamber is from about 20 to about 50 microns, preferably from about 30 to about 40 microns, of Hg. This set of conditions is merely exemplary of those which can be employed and is not to be taken as limiting of the present invention. Any freeze drying technique which is capable of drying the fibers to self-sustaining form, preferably to a moisture content of less than about 10%, while not allowing substantial melting of the ice crystals to allow excessive bonding of the fibers and does not maintain the temperature at too high a level for a period of time which would cause randomization of the fibrous structure, would be effective and appropriate according to the present invention.

Once dried, the fibrous mass can be stored for indefinite periods of time or it can be heat set immediately and then stored for subsequent use. It is, however, presently believed essential that the fibers be heat set before rehydration. The heat setting insolubilizes the protein. If not heat set before rehydration, the desirable structural properties obtained by freezing in an ordered pattern, coupled with the freeze drying, will be substantially lost. Thus, the heat treatment is necessary to cause coagulation or immobilization of the protein material in fibrous form.

It is possible through the proper selection of the particular type of heat treatment, to effect the texture, color, toughness, tensile strength, rehydration and water retention properties of the final product. Textured materials receiving severe heat treatment tend to retain less water upon rehydration. However, all textured materials according to the present invention have to receive an amount of heat treatment sufficient to stabilize the structure. Materials receiving mild heat treatment tend to be softer and more pliable than those which receive severe heat treatment. Moist heat treatment is highly efficient and gives an extremely good meat-like texture to the final product.

The amount of heat treatment, with or without pressure, to stabilize the product varies with the type of protein materials used. By way of example, dry soy milk fibers are preferably heat treated in an autoclave under a 15 psig pressure for from about 5 to 10 minutes to stabilize the structure, and fibers from soy flour, on the other hand, are preferably heat treated for from about 20 to about 25 minutes under the same conditions. Any combination of time, temperature, and pressure effective to heat set the protein into substantially independent fibers can be employed according to the present invention. It appears that heat treatment at a temperature ranging from about 100° to about 120°C for a time of from about 5 to about 30 minutes is adequate depending upon the texture desired in the final product. The exact times, temperatures, and pressures employed will be easily determinable by those skilled in the art for a wide variety of products. Reference to the examples below will show a number of specific heat treatment operations which will guide those skilled in the art.

Typical of the heating means which can be employed are conventional autoclave or steam chamber devices capable of producing pressures of up to about 20 psig and temperatures of up to about 130°C. Also suitable would be electric or gas-fired infrared ovens capable of operating under conditions of high relative humidity. The use of moist heat in such devices, or in the autoclave or steam chambers previously mentioned, aids in providing a more complete coagulation or immobilization of the protein materials. The specific heating means employed is not critical to the present invention. All that is necessary is that the heat be sufficient in time and intensity to coagulate or immobilize the protein sufficiently to substantially prevent loss of the individual protein fibers upon rehydration. Heat setting in the presence of large amounts of water cannot be tolerated because they tend to melt or change the gross structure of the fibers. Thus, while moist steam is preferred, it must not be condensed to the extent that large droplets of water will wet the fibers and cause coalescence. It is noted in this regard that rapid heating of the frozen, fibrous mass prior to freeze drying does not provide the desired well-defined, well-ordered fibrous structure. For example, rapid heating by microwave of the crystalline ice-protein mass provides a largely amorphous, bonded structure.

After heat setting, the fibrous protein material can be marketed as is, or rehydrated immediately to obtain a more meat-like texture. The product is easily rehydrated by soaking in water for a period of time effective to obtain a desired water content. The rehydrating solution can contain acids for neutralizing any residual alkali or flavorings, emulsified fats, flavor enhancers, condiments, sugars, heat coagulable or soluble proteins, amino acids, and the like. In this manner, the product can be modified to have the taste as well as the texture of meat. Of course, as indicated previously, these ingredients can also be employed in the aqueous protein mixture before freezing. Experience with particular recipes will dictate at what point these additives are employed.

The following examples are presented for the purpose of further explaining and illustrating the present invention, and are not to be taken as limiting in any regard. Unless otherwise indicated, all parts and percentages are by weight.

EXAMPLE I

To prepare a texturized soy protein product having highly-oriented, well-defined fibers, a soy milk is used as a protein source. The soy milk is prepared by soaking 600 grams of soy beans overnight in water, changing the water several times. The soaked beans are then hot ground with boiling water, the water being present at a 10:1 ratio with regard to the soy beans. The resulting slurry is heated to boiling and held there for 15 minutes, and filtered through a double layer of cheesecloth. The residue on the cheesecloth is discarded and the level of solids in the supernatant is determined. The pH of the supernatant is then adjusted to 7.5 using 2N sodium hydroxide, and an antioxidant is added to the supernatant at a level equivalent to 0.02% of the fat content. Because full fat soy beans are employed, the fat content of the supernatant is about ¼ the weight of the solids present. The soy bean milk is then placed in an aluminum pan to a depth of about one inch. The pan is placed on a block of dry ice (−76°C) which extends across the entire bottom surface of the pan. Unidirectional ice crystals, substantially perpendicular to the bottom of the pan, are generated. The mass is completely frozen in about 30 minutes. The mass is then freeze dried immediately to prevent change of the crystalline formation of the ice crystals. After freeze drying, the fibrous structure is stabilized by heat treating with moist heat at 15 psig for about 10 minutes. The heat set fibrous mass is then rehydrated by soaking in water for about 20 minutes to yield a product having discrete, long, soft and chewy fibers.

EXAMPLE II

The procedure of Example I is repeated but this time substituting a plate freezer having a plate temperature of −72°C for the dry ice. The rate of freezing is seen to be 0.256 ft/hr, expressed in terms of freezing boundary movement, and the rate of heat transfer is 750 btu/hour, expressed in terms of heat removal per unit time from the bottom surface of the freezing mixture, which in this case has an area of about 0.35 feet. The fibers are again of high quality, comparable to those obtained in Example I.

EXAMPLE III

The procedure of Example II is repeated but this time employing a plate freezer temperature of −29°C. The rate of freezing here is seen to be 0.075 ft/hr. The fibers produced in this instance are longer than the fibers produced in either Examples I or II.

EXAMPLE IV

The procedure of Example II is again repeated, this time employing a plate freezer temperature of −21°C. The rate of freezing here is seen to be 0.047 ft/hr. The fibers are similar to those produced in Example III.

EXAMPLE V

The procedure of Example II is again repeated employing a plate freezer temperature of −6°C. The rate of freezing here is seen to be 0.03 ft/hr. Here the fibers are relatively long and wide.

EXAMPLE VI

The procedure of Example II is again repeated, but this time employing the soy milk at a depth of about ½ inch, increasing the rate of freezing to 0.492 ft. hr. Here again the fiber formation is excellent, the fibers being comparable to those produced in Examples I and II.

EXAMPLE VII

The procedure of Example I is again repeated but this time employing liquid nitrogen (−196°C) in place of the dry ice as the cooling source, and instead of the aluminum pan, a tubular cellolose acetate sausage casing is employed to hold the soy milk. The lower end of the casing is submerged in liquid nitrogen. The lower end portion thereof freezes rapidly due to the extreme cold employed. But after the initial lower layer is frozen, the ice crystals begin forming more slowly, in orderly array, generally parallel to the length of the casing and perpendicular to the upper surface of the liquid nitrogen. As the distance from the liquid nitrogen increases, the fibers increase in quality. The fibers and generally unidirectional in orientation except for the lower end which is amorphous upon visual examination and contained microscopic ice crystals.

EXAMPLE VIII

A fibrous soy protein product is prepared from soy bean flour. Here 150 grams of solvent extracted soy bean flour having a protein content of approximately 50% by weight is mixed with 850 grams of water to make a 10% slurry, the pH of which is adjusted to about 10. This slurry is placed in a pan to a depth of about one inch and frozen and freeze dried as described in Example I. The fibrous structure is stabilized by treating with moist heat under a pressure of 15 psig in an autoclave for 20 minutes. The product is then rehydrated by immersing in water for about 20 minutes. The fibrous structure is excellent.

EXAMPLE IX

A fibrous fish protein product is prepared from a 10% aqueous mixture of fish protein concentrate. The aqueous mixture is adjusted to pH 11, heated at 90°C for 20 minutes and cooled. The mixture is then placed in a pan and frozen and freeze dried as described in Example I. The resulting fibrous structure is stabilized by treating with moist heat in an autoclave at a pressure of 15 psig for 10 minutes.

EXAMPLE X

A fibrous fish protein product is prepared for a 15% aqueous mixture of fresh fish meat. To prepare the aqueous mixture, 150 g of lean fish meat is homogenized with 850 ml of cold 3% NaCl aqueous solution in a Waring Blendor at high speed for about 5 minutes. The resulting homogenate mixture is then placed in a pan, frozen and freeze dried according to the procedure of Example I. Freezing time for one liter of fish homogenate, having an initial temperature of about 15°C, is about 42 minutes. The fibrous structure is stabilized by treating with moist heat in an autoclave at a pressure of 15 psig for 10 minutes.

EXAMPLE XI

A fibrous red meat protein product is prepared from lean beef. The procedure of Example X is followed except that 150 g lean beef is substituted for the fish.

EXAMPLE XII

A fibrous egg albumin product is prepared from fresh egg white. Here, the whites of several eggs are separated from the yolks, and placed in a pan, frozen and freeze dried according to the procedure of Example I. The fibrous structure is stabilized by treating with moist heat in an autoclave at a pressure of 15 psig for 10 minutes.

EXAMPLE XIII

A fibrous milk protein product is prepared from fresh whole milk. The milk is placed in a pan, frozen and freeze dried according to the procedure of Example I. The resulting fibrous structure is stabilized by treating with moist heat in an autoclave at a pressure of 15 psig for about 10 minutes.

EXAMPLE XIV

A fibrous wheat protein product is prepared from wheat protein concentrate. Here, 3 parts of wheat protein concentrate are mixed with 17 parts water and adjusted to pH 10. The mixture is placed in a pan, frozen and freeze dried according to the procedure of Example I. The fibrous structure is stabilized by treating with moist heat in an autoclave at a pressure of 15 psig for 25 minutes.

EXAMPLE XV

A fibrous soy protein product is prepared from a combination of protein sources. Here 75 grams of solvent extracted soy bean flour having a protein content of approximately 50% by weight and 75 grams of wheat protein concentrate are mixed with 850 grams of water to make a 15% slurry, the pH of which is adjusted to about 10. The slurry is placed in a pan to a depth of about one inch and frozen and freeze dried as described in Example I. The fibrous structure is stabilized by treating with moist heat under a pressure of 15 psig in an autoclave for 20 minutes. The product is then rehydrated by immersing it in water for about 15 minutes.

EXAMPLE XVI

A beef analog is prepared from a combination of wheat gluten and beef. Here 75 g of beef and 50 g of wheat gluten are mixed with 875 ml of water, homogenized, frozen, freeze dried and stabilized according to the procedure of Example XI. The dried product is rehydrated by soaking in a solution containing salt, hydrolyzed vegetable protein, beef extract, and pepper. The product is allowed to come to equilibrium with the solution whereupon it is removed and exhibits beef-like qualities of taste and texture.

EXAMPLE XVII

A delicious sweet and sour pork dish is prepared using a fibrous protein product prepared according to the procedure of Example I as partial replacement for the pork. First, pork meat balls are prepared by mixing ground pork with diced waterchestnuts, crushed garlic, chopped onions, soy sauce, sugar, salt and pepper. The meat balls are rolled in corn starch, fried to a light brown and drained.

Next, a first sauce is prepared by taking juice from a 16 ounce can of chunck style pineapple and mixing this with 3 teaspoons of brown sugar, one half teaspoon of salt, ¼ teaspoon of pepper and 2 tablespoons of vinegar. This mixture is added to 1½ tablespoons of vegetable oil and brought to a boil. To this first sauce, are added the meat balls, large chunks of the fibrous protein material of Example I, sliced carrots, sliced green pepper, and quartered onions. This mixture is heated until the pork flavor permeates the sauce and the fibrous protein takes up the taste of the total mixture.

At this point, a second sauce is prepared by mixing ½ cup of sugar, ½ cup of water, ¼ cup of vinegar, 1 tablespoon of soy sauce and 1 teaspoon of salt, and bringing these to a boil. To this is then added a thickening agent of cornstarch and water. This thickened sauce is then combined with the first sauce and the other added ingredients, and the pineapple is added to the total mixture.

The dish is delicious and the fibrous protein material of the present invention takes up the taste of the sauce well, does not have any off flavor of its own, and adds large meat-like chunks to the dish.

Many modifications and variations of the present invention will be apparent to those skilled in the art upon reading the above disclosure. It is intended that all such modifications and variations be included within the scope of the present invention which is defined by the following claims.

What is claimed:
1. A method for preparing a texturized protein material comprising:
   a. preparing a mixture comprising heat coagulable protein and water;
   b. cooling the mixture to freeze the water into elongated ice crystals and to separate the protein into well-defined, well-ordered, substantially independent zones;
   c. freeze drying the frozen mass resulting from the operation of step (b); and
   d. heating the resulting freeze dried material to coagulate the protein.
2. A process according to claim 1 wherein the cooling of step (b) is effected by cooling a single surface of the mixture.
3. A process according to claim 2 wherein the single surface is planar.
4. A process according to claim 2 wherein the single surface is spherical, hemispherical or cylindrical.
5. A process according to claim 1 wherein the cooling of step (b) is effected by cooling two opposed surfaces of the mixture.
6. A process according to claim 1 wherein the pH of the mixture comprising protein and water is adjusted to increase the solubility of the protein.
7. A process according to claim 1 wherein the mixture comprising protein and water further comprises fat.
8. A process according to claim 1 wherein the mixture comprising protein and water further comprises flavoring and seasoning.
9. A process according to claim 1 wherein the heat set texturized protein material is soaked in water to rehydrate it.
10. A process according to claim 9 wherein the water used for rehydration has flavoring and seasoning dissolved therein.
11. A process according to claim 1 wherein at least two protein materials are employed in the mixture comprising protein and water.
12. A texturized protein material having a well-defined, well-ordered structure comprised of substantially independent protein fibers, the material being prepared according to the process of claim 1.

* * * * *